United States Patent
Asrican

[15] 3,680,546
[45] Aug. 1, 1972

[54] ILLUMINATED SURGICAL RETRACTOR

[72] Inventor: Manfred Asrican, Greenwich, Conn.

[73] Assignee: Instrumentation for Medicine Inc., Greenwich, Conn.

[22] Filed: Oct. 30, 1970

[21] Appl. No.: 85,340

[52] U.S. Cl. .................................. 128/18, 350/96 B
[51] Int. Cl. ........................... A61b 1/06, G02b 5/16
[58] Field of Search............128/6, 11, 13, 16, 18, 20; 350/96 B

[56] References Cited

UNITED STATES PATENTS

| | | | |
|---|---|---|---|
| 2,702,540 | 2/1955 | Debeh | 128/20 |
| 3,504,984 | 4/1970 | Bush | 350/96 B |

FOREIGN PATENTS OR APPLICATIONS

| | | | |
|---|---|---|---|
| 854,564 | 11/1952 | Germany | 128/6 |
| 605,136 | 5/1960 | Italy | 128/18 |

*Primary Examiner*—Channing L. Pace
*Attorney*—Charles E. Temko

[57] ABSTRACT

A surgical retractor having a pair of elongated members mutually interconnected at one end thereof for relative movement, and mounting at a second end thereof opposing retracting members adapted to engage the upper and lower eyelids of a patient. A fiber optic light-transmitting cable is interconnected at one end thereof to a light source, and interconnects with a pair of smaller fiber optic cables which extend over and are supported by said pair of retracting elements. Each of said pair of smaller cables bifurcates to provide a pair of still smaller cables, the free ends of which are positioned to lie upon a surface of a retracting member, whereby light rays emanating from said free ends are directed by adjustment of the retracting members with respect to the elongated members. A second fiber optic cable includes means for mounting the free end thereof in the vicinity of said retracting members to provide external illumination to the body cavity being retracted.

3 Claims, 3 Drawing Figures

ILLUMINATED SURGICAL RETRACTOR

This invention relates generally to the field of surgical retractors, particularly those suited for eye surgery, and more particularly to an improved illuminated form thereof materially facilitating the conduct of such eye surgery.

Surgery and treatment of small body cavities presents a difficult problem with respect to illumination. In the case of major surgery where the viscera is opened, adequate illumination can be provided by overhead lighting, or by a headlight supported by the operating surgeon. In such cases, illumination may be general in nature, and a little difficulty is encountered in providing adequate light for whatever techniques are employed.

By contrast, in the case of smaller body cavities, illumination coming from a substantial distance from the cavity is of little value, and while it is possible to collimate light coming from the remote source, it is difficult to focus all of the light available into the cavity for constant illumination. Part of the difficulty is caused by the fact that the cavity being operated upon is not always stationary with respect to the light, and the remainder by the fact that the surgical instruments employed often cast a shadow upon the parts being treated. Further, an excessive total quantity of light often hinders the surgeon by virtue of the fact that the light is of a "flat" nature, which is not the best for illuminating many internal parts of the body.

It is therefore among the principal objects of the present invention to provide an improved illumination means which may be mounted directly upon the surgical retractor employed to hold the cavity in an open or retracted position.

Another object of the invention lies in the provision of improved illuminating means which may be incorporated into well known existing prior art retracting structure with relatively little modification.

Yet another object of the invention lies in the provision of an improved illuminated surgical retractor construction in which the collimated light projected thereby is directed into the body cavity without substantial illumination of the exterior of the cavity.

A further object of the invention lies in the provision of improved surgical retractor construction, in which adjustment of the retracting members thereof serves to automatically position the direction of light with respect to the body cavity for optimum utilization of the same.

A feature of the disclosed embodiment lies in the provision of separate means for providing illumination exteriorily of the body cavity for use in such surgical situations requiring the same.

These objects and feature, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

BRIEF DESCRIPTION OF THE INVENTION

Figure 1:
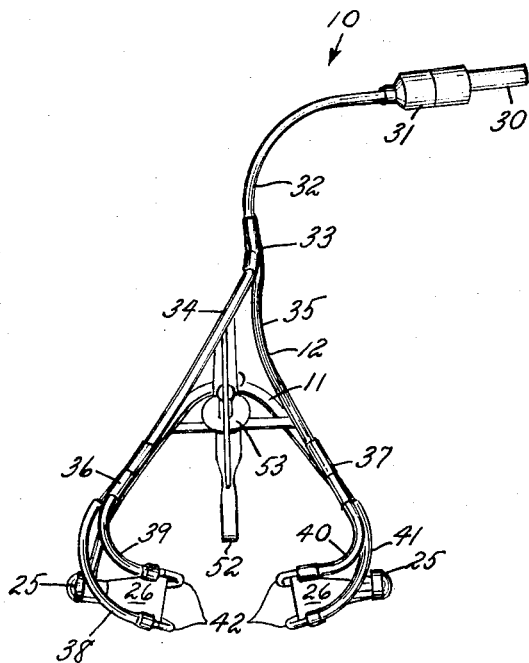
FIG. 1 is a view and perspective of an embodiment of the invention.
Figure 2:
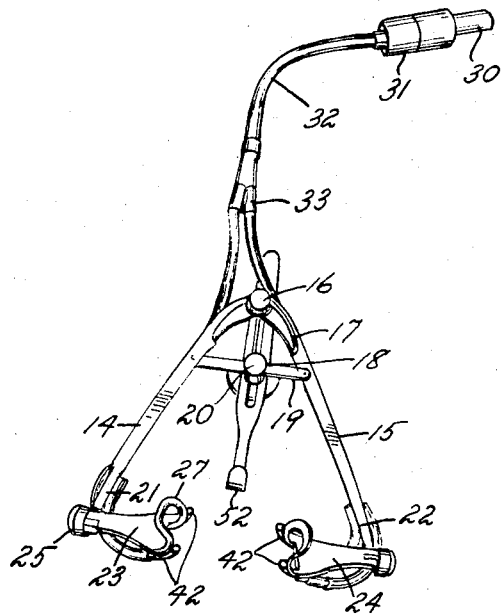
FIG. 2 is a similar view in perspective thereof, showing the side of the embodiment opposite that seen in FIG. 1.
Figure 3:
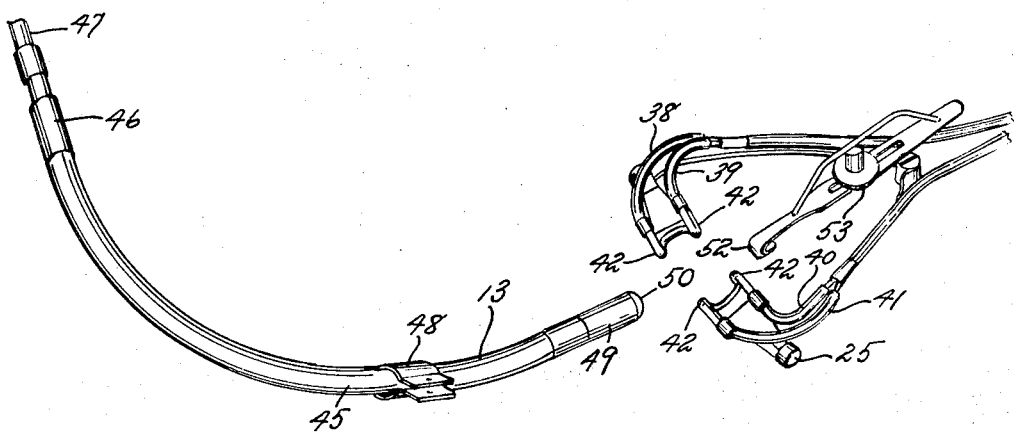
FIG. 3 is a fragmentary third view in perspective showing the cooperation of the retractor with auxiliary illumination means.

Briefly stated, the invention contemplates the provision of body cavity retracting means in which the hooked retracting members are provided with illumination means so disposed that light emanates tangentially from the surface of the hooked members. The retractor includes means for adjusting the angular disposition of the hooked means with respect to the remaining parts of the device, such adjustment serving also to position the direction of light into the cavity. Where required, separate external illuminating means is provided.

DESCRIPTION OF THE DISCLOSED EMBODIMENT

In accordance with the invention, the device, generally indicated by reference character 10, comprises broadly: a surgical retractor 11, retractor mounted illumination means 12, and auxiliary illumination means 13.

The retractor 11 may be of well known type, the drawing illustrating the so-called "Maumanee-Park" optical retracting device. Although the instant disclosure is directed to an eye cavity retractor, where the invention has particular application, it will be understood by those skilled in the art that the invention has general application to all types of surgical retractors where the accessible opening is rather small, and there exists a corresponding necessity for directing light directly into the cavity without simultaneously illuminating the external surrounding area.

The retractor 11 includes first and second elongated arms 14 and 15, respectively, pivotally interconnected by a pintle 16 for relative movement. A spring 17 normally urges the arms 14 and 15 outwardly, and locking means 18 including a pair of transversely disposed link 19 and well known rack and pinion adjustment means 20 provide for the fixing of the arms at a position of relative adjustment. The outer ends 21 and 22 of the arms 14 and 15 are provided with eyelid retention members 23 and 24, respectively, which are articulated for angular adjustment. Threaded nut means 25 maintains a given adjustment. Each member 23-24 includes a general planar portion 26, and a fenestrated hook portion 27 which in operative position engages the edges of a body cavity, as for example the upper and lower lid of the eye.

The illumination means 12 includes a light supply cable 30, a first end (not shown) of which is interconnected to a lamphousing of well known type, and a second end of which interconnects with a coupling 31 to a main cable 32. The cables 30 and 32 are of a well known fiber optic type consisting of a collimated bundle of synthetic resinous fibers capable of conducting light in an axial direction from one end to another. The main cable 32 interconnects with a bifurcated coupling 33 from which smaller cables 34 and 35 extend. Each of the cables 34—35 in turn interconnects with secondary couplings at 36 and 37 in a similar fashion, from which there extend terminal cables 38, 39, 40 and 41. The couplings 31, 36 and 37 are interconnected to the surface of the retractor 11 by spot welding, silver soldering or other suitable interconnecting means, and between the couplings, the cables 34–35 and 38–41 remain relatively flexible.

The cables 38–41 include at the free ends thereof terminal supports 42 having through openings therein through which light may project. The supports 42 are of curved configuration, so as to lie tangent to the outer surface of the hooked portions 27 to which they are attached, so that when in normal operating position, the beam of light emanating from the cables 38–41 will fall substantially perpendicularly with respect to the outer surface of the eyeball as the hooked portions 27 are pivotally adjusted; the light beam will be similarly adjusted until an optimum position is reached. Light impinging substantially normal to the surface of the eyeball will pass through the eyeball and be reflected back from the retina, thus giving the surgeon ample, relatively glareproof illumination at the precise point of work, and should any movement of the patient take place, the positioning of the light will remain constant once the retractor is engaged.

It is often desirable to have localized lighting directed externally of the body cavity. In the case of optical surgery, a collimated light source can be directed against the retracted lid to pass there through, and provide additional illumination within the eye. I find this most conveniently accomplished by the provision of the auxiliary illumination means 13 which includes a separate light supply cable 45 coupled to the same light source as the cable 30, and interconnected through a coupling 46 to a main cable 47. A mounting clip 48 surrounds the cable 47, and provides a means for pinning, clipping or otherwise attaching the cable 47 to a surrounding drape (not shown) or other fixed support, whereby the terminal member 49 may be positioned in the desired area. The member 49 includes a collimating lens 50 of well known type for localizing the path of light exiting from the cable.

Referring again to the retractor 11, certain types are provided with an additional retractor member 52 relatively adjustable with respect to the arms 14 and 15, and fixed in desired position by a locking nut 53.

Where convenient, the auxiliary illumination means 13 may be carried by this retractor.

Although I have illustrated four terminal cables 38–41, the use of which is possible by virtue of the fenestration of the hooked portions 27, it will be understood that where the hooked portions 27 are solid, a single cable may be provided for each portion 27, and a light transmitting terminal bar (not shown) of well known type may be employed to spread the illumination across the width of the portion 27.

I wish it to be understood that I do not consider the invention limited to the precise details of structure shown and set forth in this specification, for obvious modifications will occur to those skilled in the art to which the invention pertains.

I claim:

1. A surgical retractor including a pair of generally elongated members pivotally interconnected at one end of each member and curved toward each other at the other ends thereof, said elongated members each having at said other ends thereof curved hook-like retractor members mutually facing away from each other and adapted to engage tissue at opposite sides of a body cavity, illumination means mounted upon the curved portions of the retractor members and having a collimated light output, said illumination means including at least one flexible fiber optic cable terminating upon the outer surface of the curved portion of a retractor member whereby to direct a collimated beam of light into a retracted cavity engaged with said retractor.

2. Structure in accordance with claim 1, including articulated means interconnecting said retracting members to a respective elongated member, whereby adjustment of the angular disposition of said retracting members effects the adjustment of said illuminating means mounted thereupon.

3. Structure in accordance with claim 2, including auxiliary illuminating means, said means having means for positioning the same with respect to the retractor members to illuminate the exterior of an engaged body cavity.

* * * * *